(12) United States Patent
Seike et al.

(10) Patent No.: US 12,565,969 B2
(45) Date of Patent: Mar. 3, 2026

(54) FLOWMETER FAILURE DETERMINATION METHOD AND HYDROGEN FILLING APPARATUS

(71) Applicant: ENEOS Corporation, Tokyo (JP)

(72) Inventors: Tadashi Seike, Tokyo (JP); Shinji Oshima, Tokyo (JP); Ai Minoda, Tokyo (JP); Toshio Tezuka, Tokyo (JP)

(73) Assignee: ENEOS Corporation, Tokyo (JP)

( * ) Notice: Subject to any disclaimer, the term of this patent is extended or adjusted under 35 U.S.C. 154(b) by 462 days.

(21) Appl. No.: 18/001,879

(22) PCT Filed: Jun. 14, 2021

(86) PCT No.: PCT/JP2021/022481
§ 371 (c)(1),
(2) Date: Dec. 15, 2022

(87) PCT Pub. No.: WO2021/256418
PCT Pub. Date: Dec. 23, 2021

(65) Prior Publication Data
US 2023/0235858 A1 Jul. 27, 2023

(30) Foreign Application Priority Data

Jun. 18, 2020 (JP) ................................. 2020-105514

(51) Int. Cl.
F17C 13/02 (2006.01)
F17C 5/06 (2006.01)
(Continued)

(52) U.S. Cl.
CPC ................ F17C 13/02 (2013.01); F17C 5/06 (2013.01); G01F 1/84 (2013.01); G01F 25/15 (2022.01);
(Continued)

(58) Field of Classification Search
CPC ................ F17C 13/02; F17C 2221/012; F17C 2223/0123; F17C 2223/036;
(Continued)

(56) References Cited

U.S. PATENT DOCUMENTS 11,920,733 B2 * 3/2024 Tezuka .................. F17C 13/026
2013/0139897 A1 6/2013 Kim et al.
(Continued)

FOREIGN PATENT DOCUMENTS

JP 2010209980 A 9/2010
JP 2013117301 A 6/2013
(Continued)

OTHER PUBLICATIONS

Office Action (Notification of Reason(s) for Refusal) issued on May 7, 2025, in corresponding Japanese Patent Application No. 2022-531797 and machine English translation of the Office Action. (4 pages).

(Continued)

*Primary Examiner* — Kristina M Deherrera
*Assistant Examiner* — Gedeon M Kidanu
(74) *Attorney, Agent, or Firm* — Buchanan Ingersoll & Rooney PC

(57) ABSTRACT

A flowmeter failure determination method includes: a step of measuring a filling amount of hydrogen gas filled in a fuel tank of an automobile, using a flowmeter; a step of acquiring information of a pressure and a temperature of the fuel tank; a step of calculating the filling amount of the hydrogen gas filled in the fuel tank based on the acquired pressure and temperature and a capacity of the fuel tank in which an expansion rate of the fuel tank is considered; and a step of determining presence or absence of a failure of the flowmeter using an error value between the measured filling amount and the calculated filling amount.

4 Claims, 8 Drawing Sheets

(51) Int. Cl.
　　*G01F 1/84*　　　　(2006.01)
　　*G01F 25/10*　　　　(2022.01)

(52) U.S. Cl.
　　CPC ............................. *F17C 2221/012* (2013.01);
　　　　*F17C 2225/0123* (2013.01); *F17C 2225/036*
　　　　(2013.01); *F17C 2250/032* (2013.01); *F17C*
　　　　*2250/043* (2013.01); *F17C 2265/065* (2013.01)

(58) Field of Classification Search
　　CPC ........ F17C 2225/0123; F17C 2225/036; F17C
　　　　　　　2227/0337; F17C 2227/043; F17C
　　　　　　　2250/032; F17C 2250/034; F17C
　　　　　　　2250/036; F17C 2250/043; F17C
　　　　　　　2250/0439; F17C 2250/0443; F17C
　　　　　　　2250/0636; F17C 2265/065; F17C
　　　　　　　2270/0139; F17C 5/007; F17C 5/06;
　　　　　　　G01F 1/84; G01F 25/10; G01F 25/15
　　See application file for complete search history.

(56) References Cited

U.S. PATENT DOCUMENTS

| | | | |
|---|---|---|---|
| 2015/0345706 A1 | 12/2015 | Whiteman et al. | |
| 2016/0305611 A1 | 10/2016 | Handa | |
| 2017/0074707 A1 | 3/2017 | Mathison | |
| 2017/0314734 A1* | 11/2017 | Jung ........................ | F17C 5/06 |

FOREIGN PATENT DOCUMENTS

| | | | | |
|---|---|---|---|---|
| JP | 2016200267 A | 12/2016 | | |
| JP | 2019207196 A | 12/2019 | | |
| WO | WO-2019230651 A1 * | 12/2019 | ................ | F17C 5/06 |

OTHER PUBLICATIONS

De Huu et al., "Design of Gravimetric Primary Standards for Field-Testing of Hydrogen Refuelling Stations", Flow Measurement and Instrumentation, 73, 2020, 101747. doi: 10.1016/j.flowmeasinst. 2020. (6 pages).

Office Action (Patent Examination Report No. 1) issued on Dec. 7, 2023, in corresponding Australian Patent Application No. 2021293617. (6 pages).

Pope et al., "Hydrogen Field Test Standard: Laboratory and Field Performance", Flow Measurement and Instrumentation, Dec. 2015, 46(Pt A), 112-124. doi: 10.1016/j.flowmeasinst.2015.10.010. (41 pages).

International Preliminary Report on Patentability Chapter I (PCT/IB/373) issued Dec. 13, 2022 and Written Opinion (PCT/ISA/237) with translation mailed on Aug. 10, 2021 by the International Bureau of WIPO in corresponding International Patent Application No. PCT/JP2021/022481. (12 pages).

International Search Report (PCT/ISA/210) with translation mailed on Aug. 10, 2021, by the Japan Patent Office as the International Searching Authority for International Application No. PCT/JP2021/022481. (5 pages).

Extended European Search Report issued on Sep. 20, 2024, in corresponding European Patent Application No. 21826843.1. (5 pages).

* cited by examiner

FIG. 7

FLOWMETER FAILURE DETERMINATION METHOD AND HYDROGEN FILLING APPARATUS

CROSS-REFERENCE TO RELATED APPLICATIONS

This application is based upon and claims the benefit of priority from the prior Japanese Patent Application No. 2020-105514, filed on Jun. 18, 2020, and International Patent Application No. PCT/JP2021/022481, filed on Jun. 14, 2021, the entire content of each of which is incorporated herein by reference.

BACKGROUND

1. Field of the Invention

The present invention relates to failure determination technology of a measurer included in a hydrogen filling apparatus.

2. Description of the Related Art

Conventionally, a flowmeter failure diagnosis method of a measurer has been devised, the method including a step of determining the presence or absence of a failure of a flowmeter using a plurality of error values based on a plurality of pieces of past result data stored in a storage device between a measured filling amount at the end of filling measured using the flowmeter and a calculated filling amount at the end of filling calculated using a pressure, a temperature, and a capacity of a tank, and an error value at the end of current hydrogen gas filling, and outputting a result.

SUMMARY OF THE INVENTION

Incidentally, a difference between the measured filling amount and the calculated filling amount does not generally become zero due to expansion of the fuel tank, and there is an offset amount. For this reason, in the failure diagnosis method described above, when a failure is determined using a difference value between the measured filling amount and the calculated filling amount as an error value, an allowable value is set in consideration of a predetermined offset amount. However, as a result of further studies by the inventors of the present application, it has been found that an expansion rate of the fuel tank is not necessarily constant and depends on a filling pressure.

The present invention has been made in view of such a situation, and an exemplary object thereof is to provide new technology for improving the accuracy of flowmeter failure determination.

A flowmeter failure determination method according to one aspect of the present invention includes: a step of measuring a filling amount of hydrogen gas filled in a fuel tank of an automobile, using a flowmeter; a step of acquiring information of a pressure and a temperature of the fuel tank; a step of calculating the filling amount of the hydrogen gas filled in the fuel tank based on the acquired pressure and temperature and a capacity of the fuel tank in which an expansion rate of the fuel tank is considered; and a step of determining presence or absence of a failure of the flowmeter using an error value between the measured filling amount and the calculated filling amount.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 7 is a diagram illustrating a hydrogen gas filling method using a multi-stage accumulator.

DETAILED DESCRIPTION OF THE INVENTION

Figure 1:
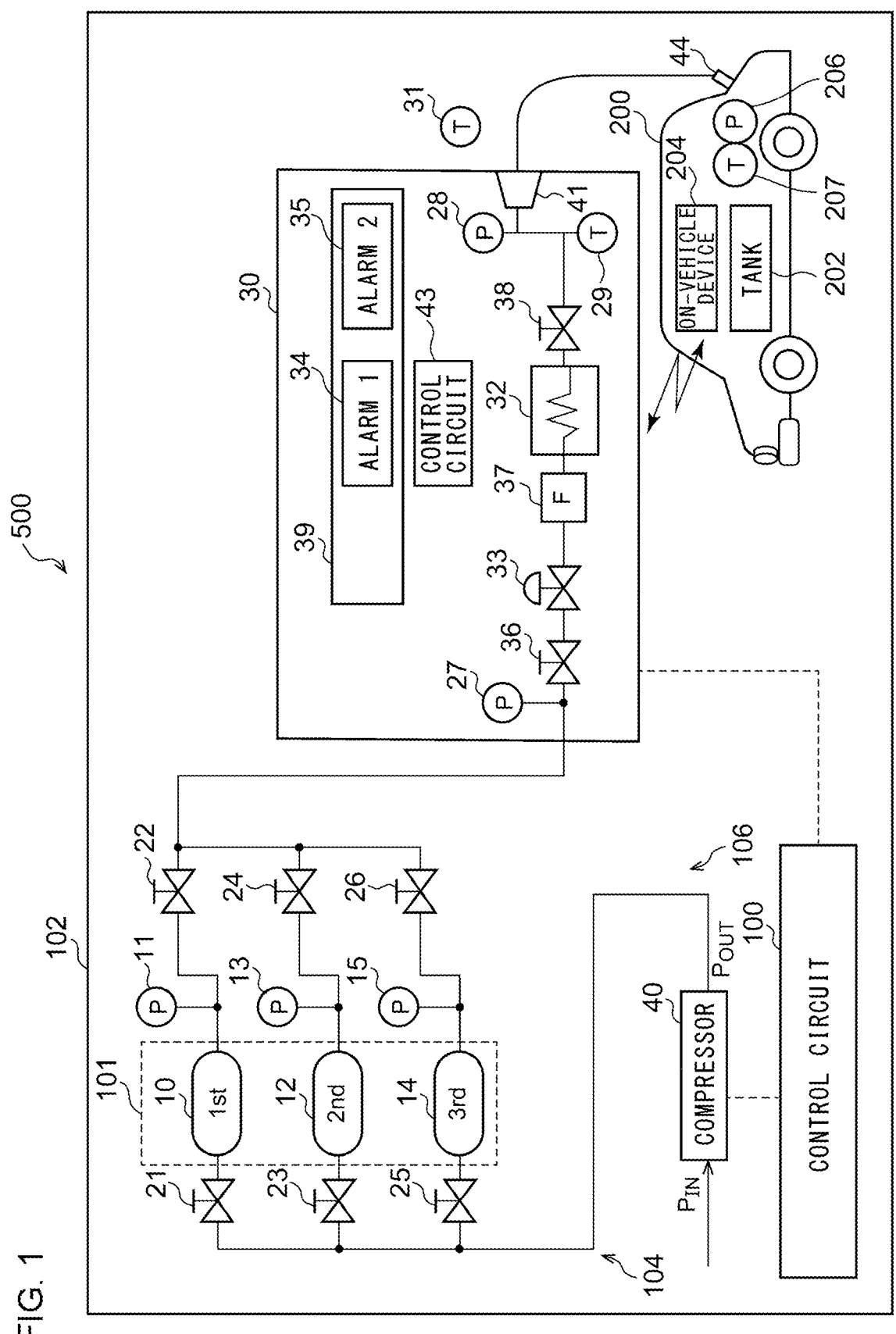
FIG. 1 is a diagram illustrating an example of a configuration of a hydrogen filling system of a hydrogen station according to the present embodiment.

First, aspects of the present invention will be listed.

A flowmeter failure determination method according to one aspect of the present invention includes: a step of measuring a filling amount of hydrogen gas filled in a fuel tank of an automobile, using a flowmeter; a step of acquiring information of a pressure and a temperature of the fuel tank; a step of calculating the filling amount of the hydrogen gas filled in the fuel tank based on the acquired pressure and temperature and a capacity of the fuel tank in which an expansion rate of the fuel tank is considered; and a step of determining presence or absence of a failure of the flowmeter using an error value between the measured filling amount and the calculated filling amount.

According to this aspect, since the expansion rate of the fuel tank is considered at the time of calculating the filling amount, the calculation accuracy of the filling amount is improved. In other words, since the error value between the measured filling amount and the calculated filling amount is reduced and the variation is reduced, the accuracy of failure determination of the flowmeter is improved.

A step of outputting a determined result may be further included. By outputting the determination result of the presence or absence of the failure of the flowmeter, the presence or absence of the failure of the flowmeter can be quickly grasped.

A step of calculating a first weight of the hydrogen gas in the fuel tank before a start of filling based on a first pressure, a first temperature, and a first capacity of the fuel tank before the start of filling, and a step of calculating a second weight of the hydrogen gas in the fuel tank after the start of filling based on a second pressure, a second temperature, and a second capacity of the fuel tank after the start of filling may be further included. The calculated filling amount may be calculated using the first weight and the second weight. By using the first capacity before the start of filling and the second capacity after the start of filling, the calculation accuracy of the filling amount can be improved.

The first capacity may be calculated using the expansion rate and the first pressure, and the second capacity may be calculated using the expansion rate and the second pressure. By calculating the first capacity using the first pressure, the first weight before the start of filling can be accurately calculated. In particular, it is possible to accurately calculate the first capacity in consideration of the expansion rate in a situation where the pressure in the fuel tank before the start of filling becomes relatively low. By calculating the second capacity using the second pressure, the second weight after the start of filling can be accurately calculated. In particular, it is possible to accurately calculate the second capacity in consideration of the expansion rate in a situation where the pressure in the fuel tank after the start of filling becomes relatively high. As a result, the calculation accuracy of the filling amount can be improved as compared with a case where the capacity is constant regardless of the pressure in the fuel tank.

The first capacity may be calculated using a first function that is non-linear with respect to the first pressure, and the second capacity may be calculated using a second function that is linear or non-linear with respect to the second pressure. The first function and the second function are expressed by, for example, mathematical expressions stored in a storage device. The inventors of the present application have focused on the fact that a deviation between the measured filling amount and the calculated filling amount increases in a situation where the filling amount is large (a situation where a difference between the first pressure and the second pressure is large). In particular, when the first pressure is small, the filling amount may be large. By calculating the first capacity using the first function that is non-linear with respect to the first pressure, the calculation accuracy of the first capacity can be improved as compared with a case of calculating the first capacity using a function proportional to the pressure in the fuel tank.

A step of specifying a type of the fuel tank may be further included. The first function and the second function may be set according to the type of the fuel tank. As a result, it is possible to determine the failure of the flowmeter when fuel tanks of various vehicle types are filled with the hydrogen gas.

Another aspect of the present invention is a hydrogen filling apparatus. This apparatus includes: a measurer that measures a filling amount of hydrogen gas filled in a fuel tank of an automobile, using a flowmeter; an acquirer that acquires information of a pressure and a temperature of the fuel tank; a filling amount calculator that calculates the filling amount of the hydrogen gas filled in the fuel tank from the measurer based on the acquired pressure and temperature and a capacity of the fuel tank in which an expansion rate of the fuel tank is considered; and a determiner that determines the presence or absence of a failure of the flowmeter using an error value between the filling amount measured using the flowmeter and the calculated filling amount.

According to this aspect, since the expansion rate of the fuel tank is considered at the time of calculating the filling amount, the calculation accuracy of the filling amount is improved. In other words, since the error value between the measured filling amount and the calculated filling amount is reduced and the variation is reduced, the accuracy of failure determination of the flowmeter is improved.

Note that any combinations of the above components and conversions of the expressions of the present invention among methods, apparatuses, systems, and the like are also effective as aspects of the present invention. In addition, appropriate combinations of the above-described elements can also be included in the scope of the invention for which patent protection is sought by the present patent application.

Hereinafter, the present invention will be described based on preferred embodiments while referring to the drawings. The embodiments do not limit the invention, but are exemplary, and all features and combinations thereof described in the embodiments are not necessarily essential to the invention. The same or equivalent components, members, and processes illustrated in the drawings will be denoted by the same reference numerals, and repeated description will be omitted as appropriate. In addition, the scale and shape of each part illustrated in the drawings are set conveniently in order to facilitate the description, and are not limitedly interpreted unless otherwise specified. In addition, even in a case of the same member, scales and the like may be slightly different between the drawings. In addition, when the terms "first", "second", and the like are used in the present specification or claims, such terms do not represent any order or degree of importance and are used to distinguish one configuration from another configuration, unless otherwise specified.

First, an example of a hydrogen filling system to which the present invention can be applied will be described. FIG. 1 is a diagram illustrating an example of a configuration of a hydrogen filling system of a hydrogen station according to the present embodiment. In FIG. 1, a hydrogen filling system 500 is disposed in a hydrogen station 102. The hydrogen filling system (hydrogen filling apparatus) 500 includes a multi-stage accumulator 101, a dispenser (measurer) 30, a compressor 40, and a control circuit 100. The multi-stage accumulator 101 includes a plurality of accumulators 10, 12, and 14 having different use lower limit pressures.

In the example of FIG. 1, the multi-stage accumulator 101 is configured by the three accumulators 10, 12, and 14. For example, the accumulator 10 functions as a 1st bank having a low use lower limit pressure, the accumulator 12 functions as a 2nd bank having an intermediate use lower limit pressure, and the accumulator 14 functions as a 3rd bank having a high use lower limit pressure. However, the present invention is not limited thereto. The accumulators used as the 1st bank to the 3rd bank can be replaced as necessary. In the hydrogen station 102, a cylinder, an intermediate accumulator, or a hydrogen production apparatus (none of which are illustrated in the drawings) is also disposed. A hydrogen trailer (not illustrated in the drawings) that delivers filled hydrogen gas arrives at the hydrogen station 102.

In FIG. 1, the suction side of the compressor 40 is connected to the cylinder, the intermediate accumulator, the filling tank of the hydrogen trailer, or the hydrogen production apparatus described above by a pipe.

The discharge side of the compressor 40 is connected to the accumulator 10 via a valve 21 by a pipe. Similarly, the discharge side of the compressor 40 is connected to the accumulator 12 via a valve 23 by a pipe. Similarly, the discharge side of the compressor 40 is connected to the accumulator 14 via a valve 25 by a pipe.

The accumulator 10 is connected to the dispenser 30 via a valve 22 by a pipe. The accumulator 12 is connected to the dispenser 30 via a valve 24 by a pipe. The accumulator 14 is connected to the dispenser 30 via a valve 26 by a pipe. As such, the dispenser 30 is commonly connected to the accumulators 10, 12, and 14 configuring the multi-stage accumulator 101.

In FIG. 1, a shut-off valve 36, a flow rate adjustment valve 33, a flowmeter 37, a cooler 32 (precooler), a shut-off valve 38, an emergency detachment coupler 41, and a control circuit 43 are disposed in the dispenser 30. A nozzle 44 extending to the outside of the dispenser 30 is disposed in the dispenser 30. The dispenser 30 sends hydrogen gas (hydrogen fuel) supplied from the multi-stage accumulator 101 to the cooler 32 via the shut-off valve 36, the flow rate adjustment valve 33, and the flowmeter 37. At that time, a flow rate of the hydrogen gas supplied from the multi-stage accumulator 101 per unit time is controlled by the flow rate adjustment valve 33.

The dispenser 30 measures a filling amount of hydrogen gas to be filled in a fuel tank 202 of a fuel cell vehicle (FCV) 200 from the multi-stage accumulator 101. Specifically, a mass flow rate of the hydrogen gas to be filled in the fuel tank 202 is measured by the flowmeter 37. In the present embodiment, for example, a Coriolis-type mass flowmeter is used as the flowmeter 37. The control circuit 43 integrates the mass flow rate measured by the flowmeter 37 to measure the filling amount. The filling amount measured using the flowmeter 37 is also referred to as a "measured filling amount". The filled hydrogen gas is cooled to, for example, −40° C. by the cooler 32. The cooled hydrogen gas is filled in the fuel tank 202 through the shut-off valve 38, the emergency detachment coupler 41, and the nozzle 44 using a differential pressure.

The control circuit 43 is configured to be able to communicate with an on-vehicle device 204 in the FCV 200. For example, the control circuit 43 can wirelessly communicate with the on-vehicle device 204 using infrared rays. The control circuit 43 is connected to the control circuit 100 that controls the entire hydrogen filling system 500. A display panel 39 is disposed on an outer surface of the dispenser 30. Alarm lamps 34 and 35 are disposed inside the display panel 39.

In the hydrogen filling system 500 in FIG. 1, a plurality of pressure gauges are disposed at different positions in a flow passage of the hydrogen fuel between the multi-stage accumulator 101 and the outlet of the dispenser 30. Specifically, a pressure in the accumulator 10 is measured by a pressure gauge 11. A pressure in the accumulator 12 is measured by a pressure gauge 13. A pressure in the accumulator 14 is measured by a pressure gauge 15. A pressure in the vicinity of the inlet in the dispenser 30 is measured by a pressure gauge 27. A pressure in the vicinity of the outlet in the dispenser 30 is measured by a pressure gauge 28.

In the example of FIG. 1, the pressure gauge 27 measures the pressure of the upstream side (primary side) of the shut-off valve 36 located at the primary side of the cooler 32. The pressure gauge 28 measures the pressure in the vicinity of the emergency detachment coupler 41 on the secondary side of the cooler 32. Pressure data measured by each pressure gauge is output to the control circuit 100 at all times or at a predetermined sampling cycle (for example, 10 msec to several sec.). In other words, the control circuit 100 monitors the pressure measured by each pressure gauge at all times or at a predetermined sampling cycle.

The pressure of the fuel tank 202 is measured by a pressure gauge 206 mounted on the FCV 200. As will be described later, the pressure of the fuel tank 202 is monitored at all times or at predetermined sampling intervals (for example, 10 msec to several sec.) while communication between the on-vehicle device 204 and the control circuit 43 is established.

A temperature of the hydrogen gas in the vicinity of the outlet in the dispenser 30 is measured by a thermometer 29. The thermometer 29 measures a temperature in the vicinity of the emergency detachment coupler 41, for example, on the secondary side of the cooler 32. In addition, an outside air temperature in the vicinity of the dispenser 30 is measured by the thermometer 31. Temperature data measured by each thermometer is output to the control circuit 100 at all times or at a predetermined sampling cycle (for example, 10 msec to several 10 sec.). In other words, the control circuit 100 monitors the temperature measured by each thermometer at all times or at a predetermined sampling cycle.

A temperature of the fuel tank 202 is measured by a thermometer 207 mounted on the FCV 200. As will be described later, the temperature of the fuel tank 202 is monitored at all times or at predetermined sampling intervals (for example, 10 msec to several sec.) while communication between the on-vehicle device 204 and the control circuit 43 is established.

The hydrogen gas accumulated in the cylinder, the intermediate accumulator, or the tank of the hydrogen trailer is supplied to the suction side of the compressor 40 in a state where a pressure is reduced to a low pressure (for example, 0.6 MPa) by each regulator (not illustrated in the drawings) controlled by the control circuit 100. Similarly, the hydrogen gas produced by the hydrogen production apparatus is supplied to the suction side of the compressor 40 in a state of a low pressure (for example, 0.6 MPa). The compressor 40 compresses the hydrogen gas supplied at a low pressure under the control of the control circuit 100, and supplies the compressed hydrogen gas to each of the accumulators 10, 12, and 14 of the multi-stage accumulator 101. The compressor 40 compresses the hydrogen gas until the pressure in each of the accumulators 10, 12, and 14 reaches a predetermined high pressure (for example, 82 MPa). In other words, the compressor 40 compresses the hydrogen gas until a secondary side pressure $P_{OUT}$ of the discharge side becomes a predetermined high pressure (for example, 82 MPa).

The control circuit 100 determines any one of the cylinder, the intermediate accumulator, the hydrogen trailer, and the hydrogen production apparatus as a supply source for supplying the hydrogen gas to the suction side of the compressor 40. Similarly, the control circuit 100 determines which one of the accumulators 10, 12, and 14 the hydrogen gas is supplied to from the compressor 40 by controlling opening and closing of the valves 21, 23, and 25. The control circuit 100 may perform control to simultaneously supply the hydrogen gas from the compressor 40 to two or more accumulators.

In the example described above, the case where a pressure $P_{IN}$ at which the hydrogen gas is supplied to the suction side of the compressor 40 is controlled so as to be reduced to the predetermined low pressure (for example, 0.6 MPa) is illustrated. However, the present invention is not limited thereto. For example, when the hydrogen gas accumulated in the cylinder, the intermediate accumulator, or the hydrogen trailer is supplied to the suction side of the compressor 40, the pressure of the hydrogen gas may not be reduced or may be reduced to a pressure higher than a predetermined low pressure (for example, 0.6 MPa).

The hydrogen gas accumulated in the multi-stage accumulator 101 is cooled by the cooler 32 in the dispenser 30 and supplied from the dispenser 30 to the FCV 200.

Figure 2:
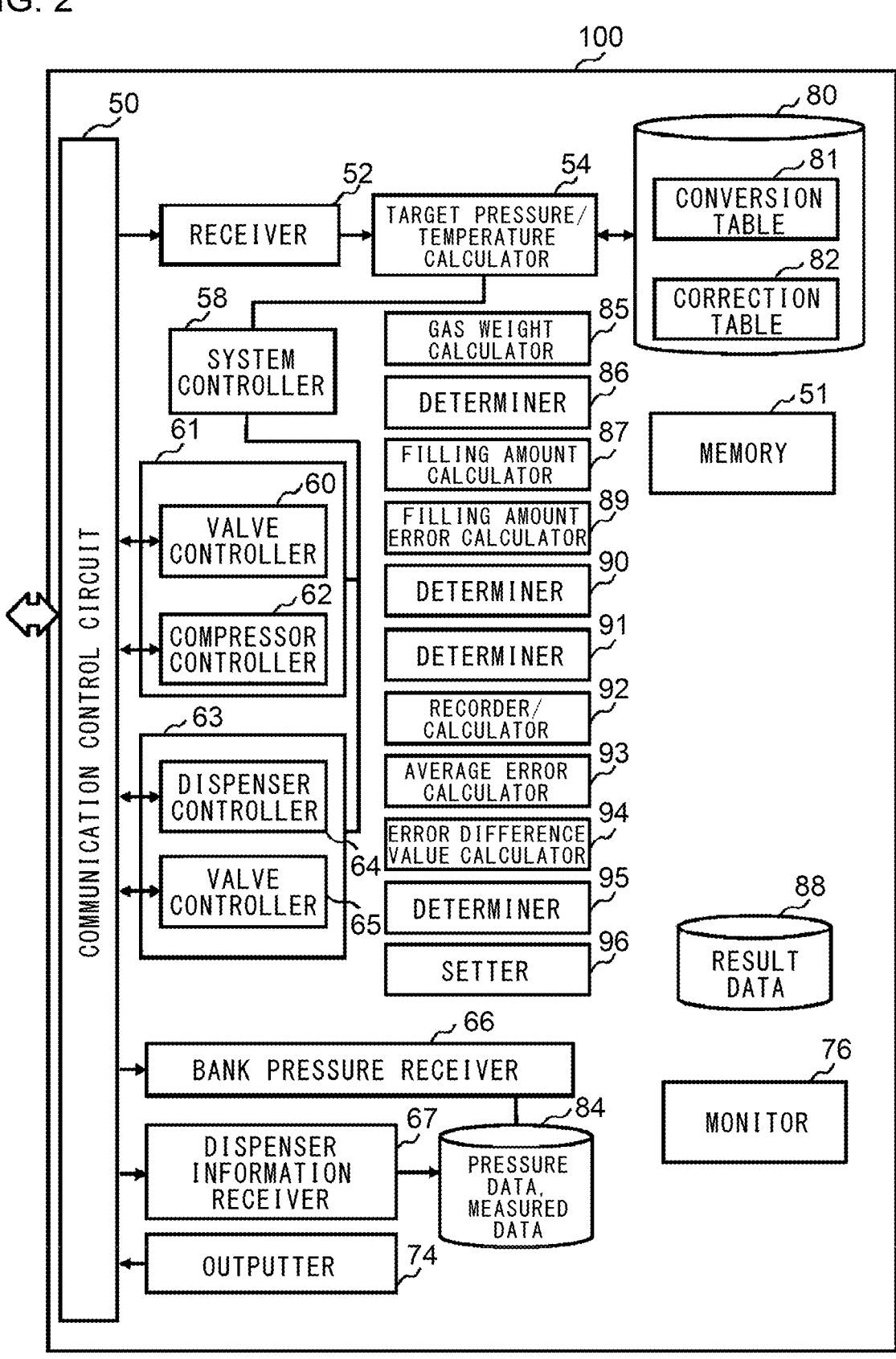
FIG. 2 is a configuration diagram illustrating an example of an internal configuration of a control circuit that controls the entire hydrogen filling system according to the present embodiment.

FIG. 2 is a configuration diagram illustrating an example of an internal configuration of a control circuit that controls the entire hydrogen filling system according to the present embodiment. In FIG. 2, a communication control circuit 50, a memory 51, a receiver 52, a target pressure/temperature calculator 54, a system controller 58, a pressure recovery controller 61, a supply controller 63, a bank pressure receiver 66, a dispenser information receiver 67, an outputter 74, a gas weight calculator 85, a determiner 86, a filling amount calculator 87, a filling amount error calculator 89, a determiner 90, a determiner 91, a recorder/calculator 92, an average error calculator 93, an error difference value calculator 94, a determiner 95, a setter 96, a monitor 76, and storage devices 80, 84, and 88 such as magnetic disk devices are disposed in the control circuit 100. The pressure recovery controller 61 has a valve controller 60 and a compressor controller 62. The supply controller 63 has a dispenser controller 64 and a valve controller 65.

Each device such as the receiver 52, the target pressure/temperature calculator 54, the system controller 58, the pressure recovery controller 61 (the valve controller 60 and the compressor controller 62), the supply controller 63 (the dispenser controller 64 and the valve controller 65), the bank pressure receiver 66, the dispenser information receiver 67, the outputter 74, the gas weight calculator 85, the determiner 86, the filling amount calculator 87, the filling amount error calculator 89, the determiner 90, the determiner 91, the recorder/calculator 92, the average error calculator 93, the error difference value calculator 94, the determiner 95, and the setter 96 includes a processing circuit, and the processing circuit includes an electric circuit, a computer, a processor, a circuit board, or a semiconductor device. For example, a central processing unit (CPU), a field-programmable gate array (FPGA), or an application specific integrated circuit (ASIC) may be used as the processing circuit.

The above-described devices may use a common processing circuit (the same processing circuit). Alternatively, different processing circuits (separate processing circuits) may be used. Input data required by each of the above-described devices or a result calculated by each of the above-described devices is stored in the memory 51 each time.

FCV information such as a pressure P, a temperature T, and a capacity V of the fuel tank 202 received from the FCV 200 is stored in the storage device 80. In the storage device 80, a conversion table 81 indicating a correlation between a weight N of the hydrogen gas in the fuel tank 202 corresponding to the FCV information and filling information such as a target pressure Pg and a target temperature Tg of the hydrogen gas to be filled in the fuel tank 202 is stored. Further, a correction table 82 for correcting a result obtained from the conversion table 81 is stored in the storage device 80.

The bank pressure receiver 66 receives the pressure measured by each of the pressure gauges 11, 13, and 15 in the accumulator 10 at all times or at a predetermined sampling cycle, and stores the pressure in the storage device 84 together with a reception time. The dispenser information receiver 67 receives the pressure measured by each of the pressure gauges 27 and 28 in the dispenser 30 at all times or at a predetermined sampling cycle, and stores the pressure in the storage device 84 together with a reception time. The dispenser information receiver 67 receives the temperature measured by the thermometer 29 in the dispenser 30 at all times or at a predetermined sampling cycle, and stores the temperature in the storage device 84 together with a reception time.

As described above, the filling amount (mass flow rate) of the hydrogen gas filled in the fuel tank 202 is measured using the flowmeter 37. The flowmeter 37 measures the mass flow rate at the moment of filling, and generates a pulse for every 1 g, for example, which is a minute flow rate unit. A pulse signal is output to the control circuit 43. The control circuit 43 measures a measured filling amount Mm by counting the number of pulses generated from the start of filling and integrating the mass flow rate.

The measured filling amount Mm is displayed on the display panel 39 disposed on the outer surface of the dispenser 30 while a value at a present time changes every moment during filling, and is output to the control circuit 100. The measured filling amount Mm is original data of a charge paid by a consumer. In other words, the charge paid by the consumer (user) is an amount of money obtained by multiplying the displayed measured filling amount Mm by a price of the hydrogen gas per unit filling amount. Therefore, the measurement accuracy of the flowmeter 37 becomes important.

As described above, the FCV 200 outputs the FCV information such as the pressure P, the temperature T, and the capacity V of the fuel tank 202. The display panel 39 may display these numerical values. Specifically, numerical values of a pressure Pt and a temperature Tt at a current time t of the fuel tank 202 may be displayed on the display panel 39 while changing every moment.

The control circuit 100 calculates a density $\rho(P, T)$ of the hydrogen gas in the fuel tank 202 using the pressure P and the temperature T of the fuel tank 202 and the compression rate unique to hydrogen. The control circuit 100 calculates a weight $N=\rho(P, T)\times V$ of the hydrogen gas in the fuel tank 202 by multiplying the density $\rho(P, T)$ by the capacity V of the fuel tank 202. The control circuit 100 calculates, as the weight N, a first weight N1 before the start of filling and a second weight N2 after the start of filling. The first weight N1 is calculated by multiplying a density $\rho(P1, T1)$ calculated from a first pressure (initial pressure) P1 and a first temperature (initial temperature) T1 of the fuel tank 202 before the start of filling by the capacity V (that is, $N1=\rho(P1, T1)\times V$). The second weight N2 is calculated by multiplying a density $\rho(P2, T2)$ calculated from a second pressure P2 and a second temperature T2 after the start of filling by the capacity V (that is, $N2=\rho(P2, T2)\times V$). Here, "after the start of filling" includes timing at an arbitrary time t during filling and timing at the end of filling to end the filling.

The control circuit 100 calculates a filling amount Mc of the hydrogen gas by subtracting the first weight N1 from the second weight N2 (that is, $Mc=N2-N1$). The filling amount calculated based on the first weight N1 and the second weight N2 is also referred to as a "calculated filling amount". The calculated filling amount Mc is a value calculated using the pressure P and the temperature T of the fuel tank 202 and the compression rate unique to hydrogen, and is a value calculated by a PVT method (volume method). The calculated filling amount Mc corresponds to the weight of the hydrogen gas filled in the fuel tank 202 after the start of filling.

The calculated filling amount Mc can be used to evaluate the validity of the measured filling amount Mm measured using the flowmeter 37. Therefore, a filling amount error $\Delta M$ obtained by subtracting the calculated filling amount Mc from the measured filling amount Mm is divided by the calculated filling amount Mc and multiplied by 100 to evaluate a percentage error of the flowmeter 37.

Figure 3:
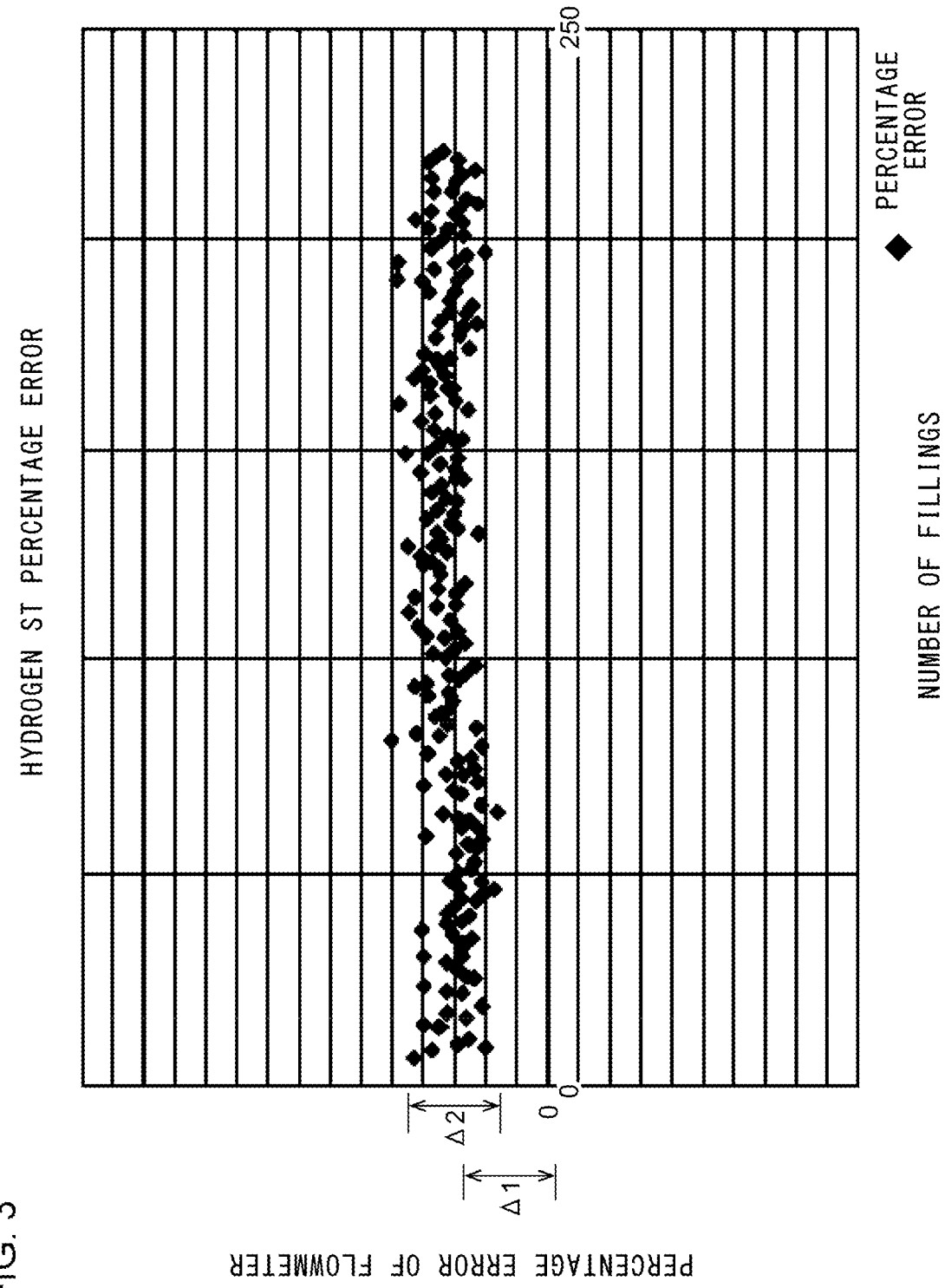
FIG. 3 is a diagram illustrating an example of a change in percentage error of a flowmeter with respect to the number of fillings.

FIG. 3 is a diagram illustrating an example of a change in percentage error of the flowmeter 37 with respect to the number of fillings. In the example of FIG. 3, an example of a case where no abnormality has occurred in the flowmeter 37 during a verification period is illustrated. In FIG. 3, a vertical axis represents the percentage error of the flowmeter 37, and a horizontal axis represents the number of fillings. As illustrated in FIG. 3, by verifying the magnitude of the time-series percentage error based on the number of fillings using many filling results, it is possible to continuously confirm a temporal change of the flowmeter 37. From a result of FIG. 3, it can be seen that the percentage error of the flowmeter 37 stably falls within a width Δ2. The reason why the percentage error of the flowmeter 37 is not zero and the offset Δ1 is generated on the positive side is that the fuel tank 202 expands due to filling, and a deviation occurs due to the expansion in the calculation result in the PVT method.

Figure 4:
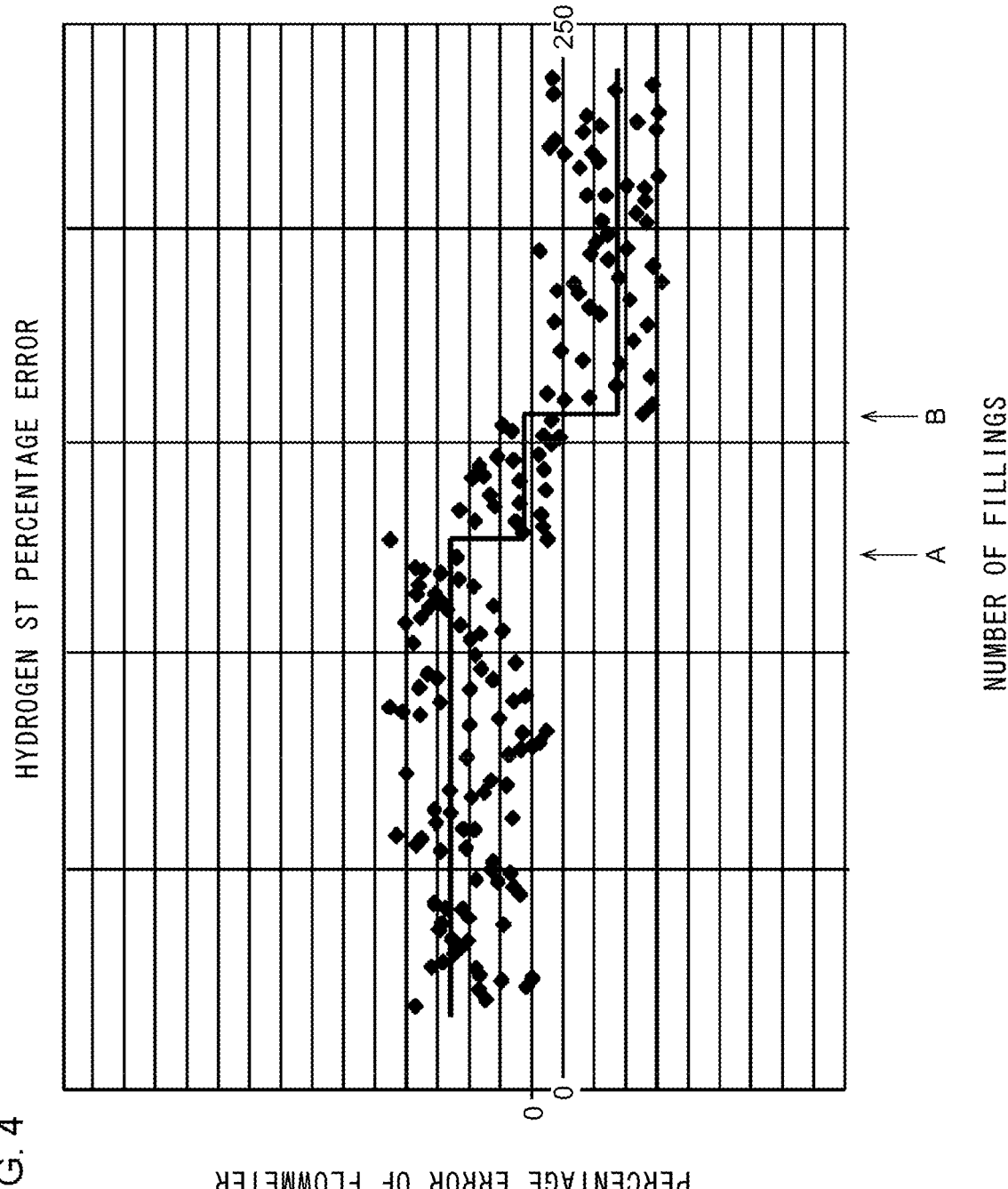
FIG. 4 is a diagram illustrating another example of the change in the percentage error of the flowmeter with respect to the number of fillings.

FIG. 4 is a diagram illustrating another example of the change in the percentage error of the flowmeter with respect to the number of fillings. In the example of FIG. 4, an example of a case where an abnormality has occurred in the flowmeter 37 during the verification period is illustrated. In FIG. 4, a vertical axis represents the percentage error of the flowmeter 37, and a horizontal axis represents the number of fillings. In the example of FIG. 4, it can be seen that a variation in the percentage error of the flowmeter 37 increases as the number of fillings increases, and a value is greatly changed (shifted) stepwise twice when the number of fillings is A and B. For a method for shifting the value, in the example of FIG. 4, the positive-side offset is shifted to the negative side. As described above, a large change in the percentage error of the flowmeter 37 in a short period indicates that a large abnormality (failure) other than a temporal change has occurred in the flowmeter 37.

First, the variation in the percentage error of the flowmeter 37 can be determined for the first time by continuous verification with the large number of fillings according to the present embodiment. On the other hand, in a conventional weighting method, measurement is generally performed only about four times. Therefore, in the conventional weighting method, it is difficult to determine whether or not the variation is large. For the sudden large change (shift) in the percentage error of the flowmeter 37, it is possible to specify when the percentage error of the flowmeter 37 is greatly changed (shifted) for the first time by the continuous verification according to the present embodiment, and it is possible to detect an abnormality of the flowmeter 37.

From the above results, it can be seen that it is useful to compare and verify the calculated filling amount Mc and the measured filling amount Mm. Therefore, in the present embodiment, failure diagnosis of the flowmeter 37 is performed using an error value between the calculated filling amount Mc and the measured filling amount Mm. In the examples of FIGS. 3 and 4, the description has been given using the percentage error, but the verifiable error value is not limited thereto. Hereinafter, a case where a filling amount error ΔM=Mm−Mc, which is a difference between the calculated filling amount Mc and the measured filling amount Mm, is used as an error value will be described.

Figure 5:
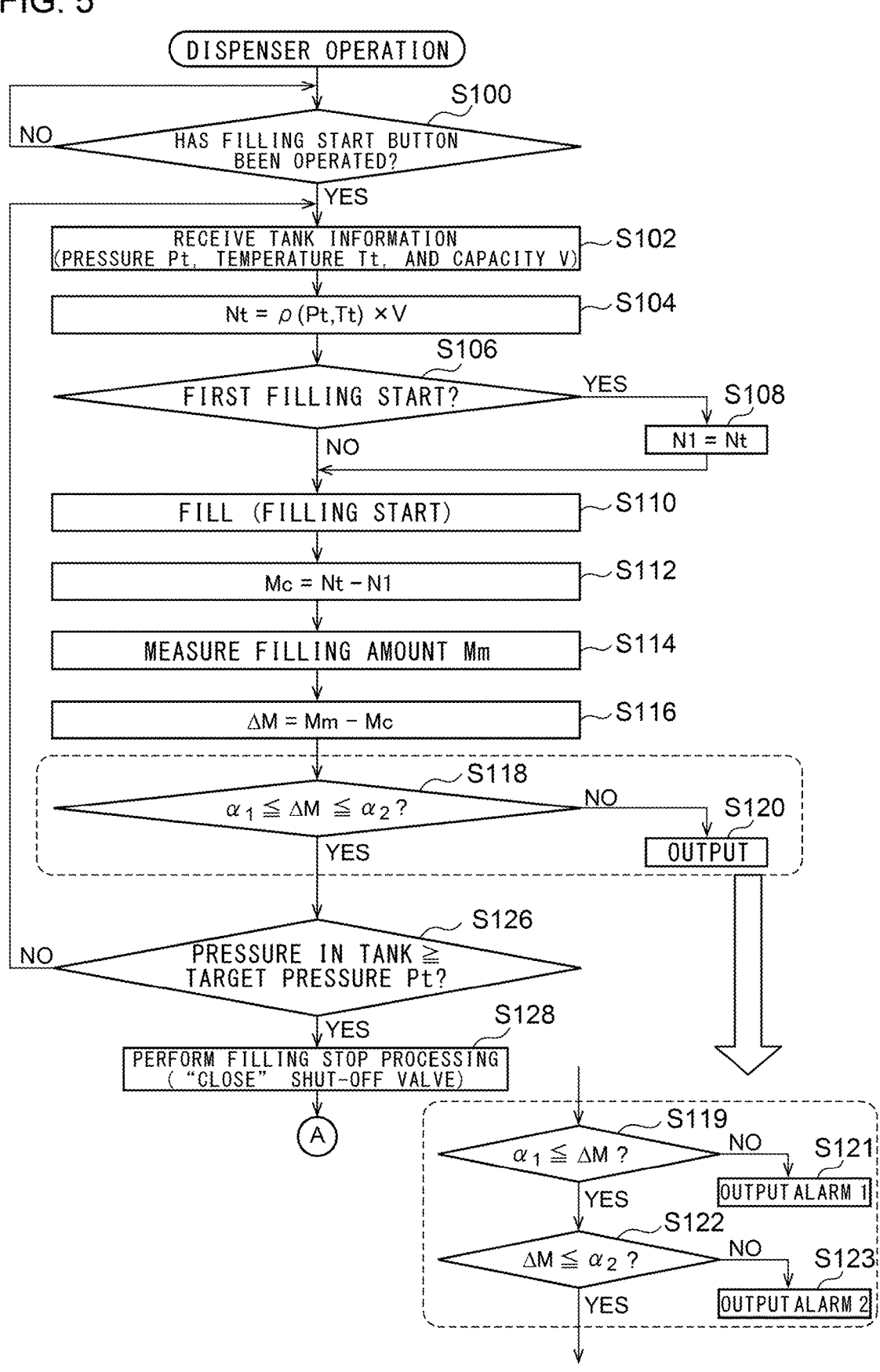
FIG. 5 is a flowchart illustrating a part of steps of a hydrogen gas filling method in the present embodiment.
Figure 6:
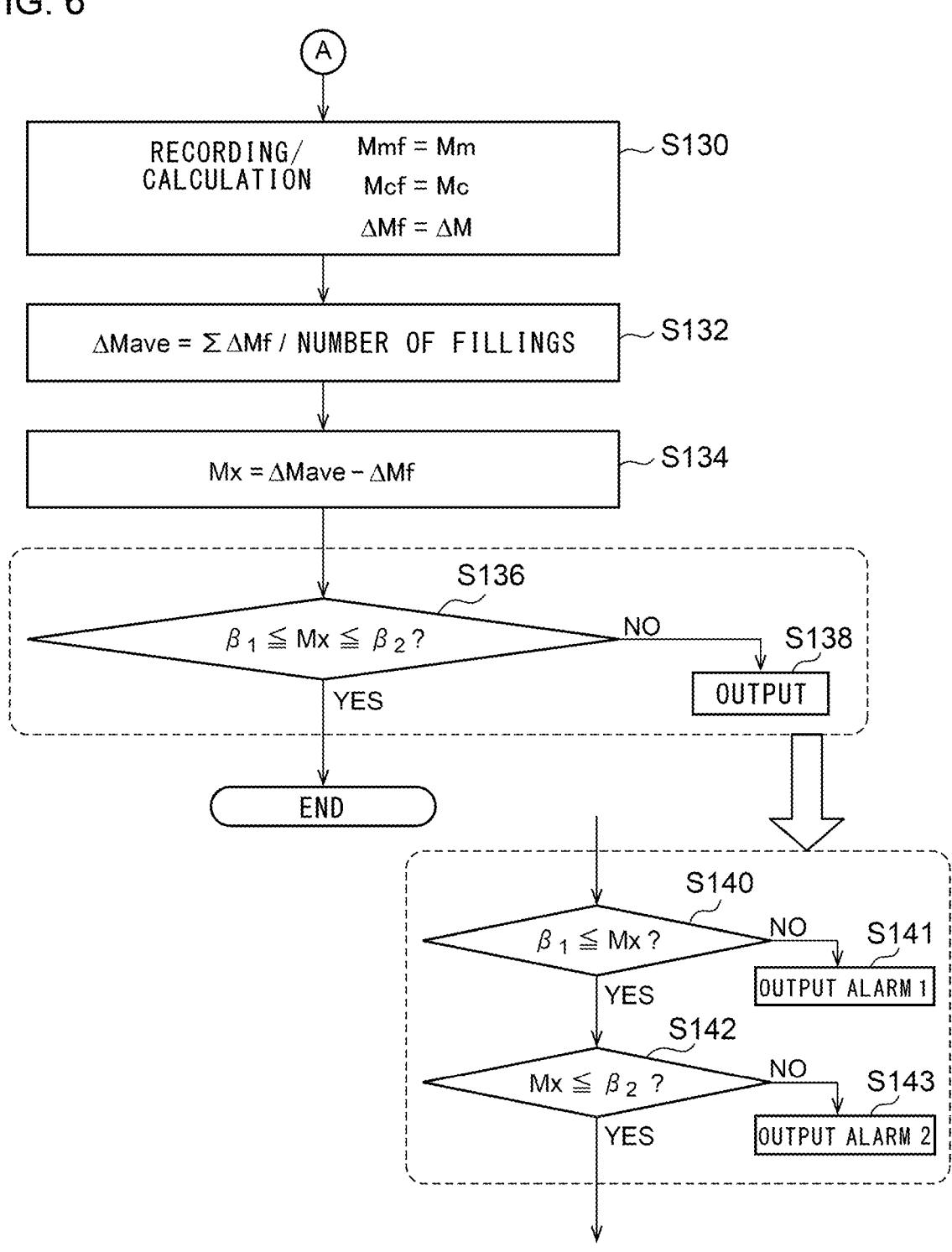
FIG. 6 is a flowchart illustrating a remaining part of the steps of the hydrogen gas filling method in the present embodiment.

FIG. 5 is a flowchart illustrating a part of steps of a hydrogen gas filling method in the present embodiment. FIG. 6 is a flowchart illustrating a remaining part of the step of the hydrogen gas filling method in the present embodiment.

In FIGS. 5 and 6, the hydrogen gas filling method according to the present embodiment executes a determination step (S100), an FCV information reception step (S102), a gas weight calculation step (S104), a determination step (S106), an initial weight setting step (S108), a filling step (S110), a filling amount calculation step (S112), a filling amount measurement step (S114), a filling amount error calculation step (S116), a determination step (S118), an alarm output step (S120), a determination step (S126), a filling stop processing step (S128), a recording/calculation step (S130), an average error calculation step (S132), a difference calculation step (S134), a determination step (S136), and an alarm output step (S138).

When the FCV 200 arrives at the hydrogen station 102, a worker of the hydrogen station 102 or a user of the FCV 200 connects (fits) the nozzle 44 of the dispenser 30 to a reception port (receptacle) of the fuel tank 202 of the FCV 200, and fixes the nozzle 44. Then, the worker or the user presses a filling start button (not illustrated in the drawings) in the display panel 39 of the dispenser 30.

As the determination step (S100), the control circuit 43 determines whether or not the worker or the user has pressed the filling start button. When the filling start button is pressed (YES in S100), the process proceeds to the FCV information reception step (S102). When the start button is not pressed (NO in S100), the process does not proceed to the next step. When the filling start button is pressed, communication between the on-vehicle device 204 and the control circuit 43 (repeater) is established.

As the FCV information reception step (S102), the receiver 52 receives FCV information such as the temperature Tt, the pressure Pt, and the capacity V of the fuel tank 202 at the present time (time t) from the FCV 200. Specifically, the following operation is performed. When communication between the on-vehicle device 204 and the control circuit 43 (repeater) is established, the FCV information (tank information) is output (transmitted) in real time from the on-vehicle device 204.

The FCV information is relayed by the control circuit 43 included in the dispenser 30 and transmitted to the control circuit 100 that controls the entire hydrogen filling system 500. In the control circuit 100, the receiver 52 receives the FCV information via the communication control circuit 50. The FCV information is monitored at all times or at predetermined sampling intervals (for example, 10 msec to several sec.) while communication between the on-vehicle device 204 and the control circuit 43 is established. The received FCV information is stored in the storage device 80 together with information of a reception time.

As the gas weight calculation step (S104), the gas weight calculator 85 calculates a weight Nt of the hydrogen gas filled in the fuel tank 202 at the present time (time t) by using the PVT method. Specifically, the gas weight calculator 85 calculates a density ρ(Pt, Tt) of the hydrogen gas using the pressure Pt and the temperature Tt of the fuel tank 202 at the present time and the compression rate unique to hydrogen. The gas weight calculator 85 calculates a weight Nt=ρ(Pt, Tt)×V of the hydrogen gas in the fuel tank 202 at the present time by multiplying the density ρ(Pt, Tt) by the capacity V of the fuel tank 202.

As the determination step (S106), the determiner 86 determines whether or not determination processing is first determination processing from the start of filling. When the determination processing is the first determination processing (YES in S106), the process proceeds to the initial weight setting step (S108). When the determination processing is not the first determination processing, that is, when the determination processing is second or subsequent determination processing from the start of the current filling (NO in S106), the process proceeds to the filling amount calculation step (S112) while continuing the filling step (S110) to be described later.

As the initial weight setting step (S108), the setter 96 sets the calculated weight Nt of the hydrogen gas to the first weight N1 when the determination processing is the first determination processing in the determination step (S106), that is, before the start of filling. The first weight N1 can be calculated as N1=ρ(P1, T1)×V using the FCV information (the first temperature T1 and the first pressure P1) before the start of filling.

As the filling step (S110), first, the target pressure/temperature calculator 54 reads the conversion table 81 from the storage device 80, and calculates the target pressure Pg and the target temperature Tg corresponding to the first pressure P1, the first temperature T1, and the capacity V of the fuel tank 202 and the outside air temperature T'. In addition, the target pressure/temperature calculator 54 reads the correction table 82 from the storage device 80 and corrects the numerical value obtained by the conversion table 81. The correction table 82 is used to correct the numerical value obtained by the conversion table 81 with a correction value set based on a result obtained by an experiment, a simulation, or the like in a case where an error is large in a result obtained only by the data of the conversion table 81. The calculated target pressure Pg and target temperature Tg are output to the system controller 58.

Next, the fuel tank 202 starts to be filled with the hydrogen gas from the multi-stage accumulator 101 via the dispenser 30.

Figure 7:
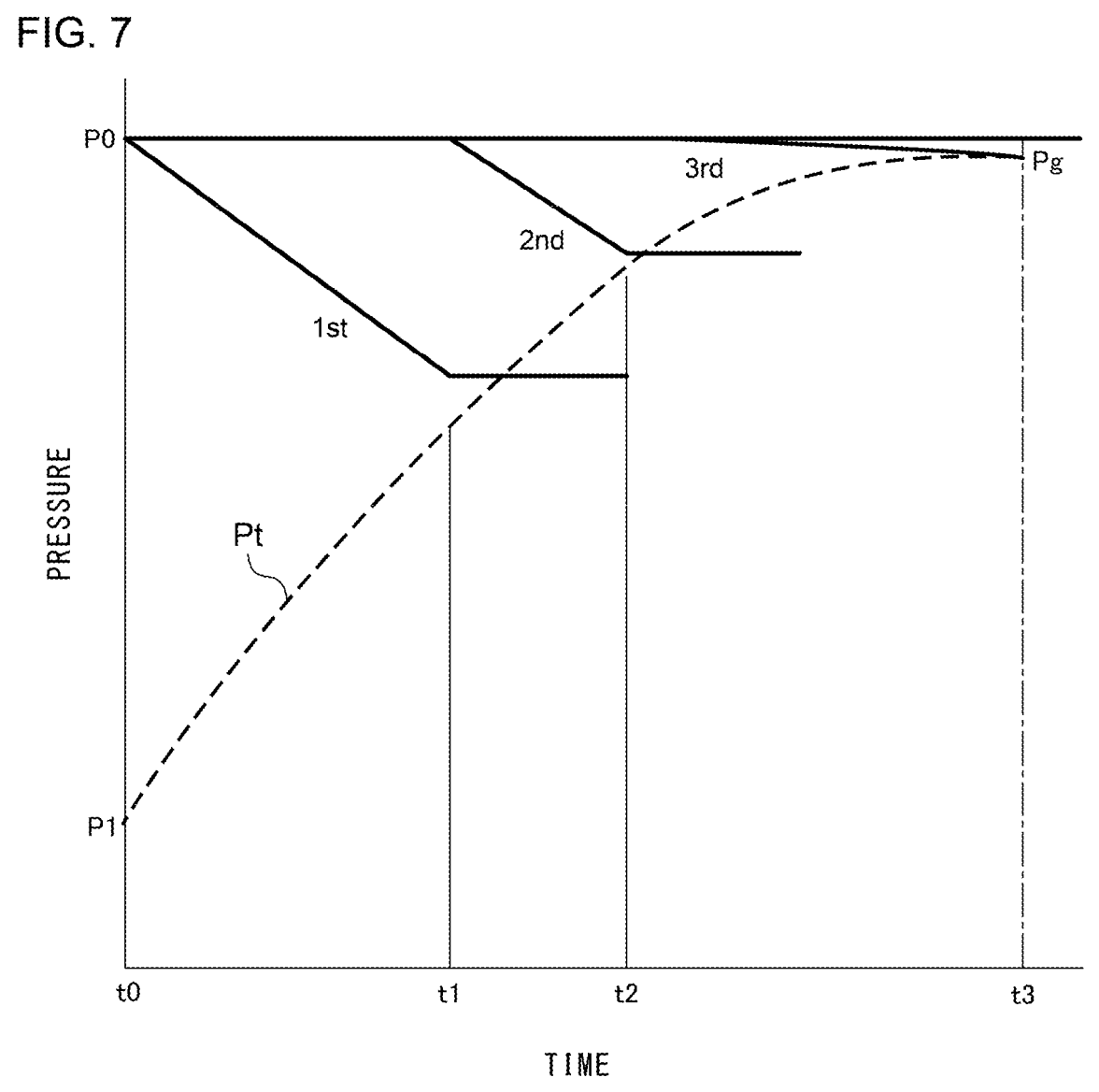

FIG. 7 is a diagram illustrating a hydrogen gas filling method using the multi-stage accumulator. In FIG. 7, a vertical axis represents a pressure, and a horizontal axis represents a time. In a case of performing the differential pressure filling of the hydrogen gas on the FCV 200, the accumulators 10, 12, and 14 of the multi-stage accumulator 101 are generally accumulated at the same pressure P0 (for example, 82 MPa) in advance. On the other hand, the fuel tank 202 has the first pressure P1 at a time t0 when filling starts. A case of starting the filling of the fuel tank 202 with the hydrogen gas from such a state will be described.

First, filling of the fuel tank 202 with the hydrogen gas from the 1st bank (for example, the accumulator 10) is started. Specifically, the following operation is performed. Under the control of the system controller 58, the supply controller 63 controls a supplier 106 and causes the supplier 106 to supply the hydrogen gas from the accumulator 10 to the fuel tank 202 of the FCV 200. Specifically, the system controller 58 controls the dispenser controller 64 and the valve controller 65. The dispenser controller 64 communicates with the control circuit 43 of the dispenser 30 via the communication control circuit 50, and controls the operation of the dispenser 30.

Specifically, first, the control circuit 43 adjusts an opening of the flow rate adjustment valve in the dispenser 30, and opens the shut-off valves 36 and 38 in the dispenser 30. Then, the valve controller 65 outputs control signals to the valves 22, 24, and 26 via the communication control circuit 50, and controls opening and closing of each valve. Specifically, the valve 22 is opened and the valves 24 and 26 are kept closed. As a result, the hydrogen gas is supplied from the accumulator 10 to the fuel tank 202. By the differential pressure between the accumulator 10 and the fuel tank 202, the hydrogen gas accumulated in the accumulator 10 moves to the side of the fuel tank 202 at a filling speed adjusted by the flow rate adjustment valve, and the pressure of the fuel tank 202 gradually increases as indicated by a dotted line Pt. Accordingly, the pressure (graph indicated by "1st") of the accumulator 10 gradually decreases. Then, when a time t1 at which the pressure falls below the use lower limit pressure of the 1st bank elapses, the accumulator to be used is switched from the accumulator 10 to the 2nd bank (for example, the accumulator 12).

At the time of switching to the accumulator 12, the valve controller 65 outputs control signals to the valves 22, 24, and 26 via the communication control circuit 50, and controls opening and closing of each valve. Specifically, the valve 24 is opened, the valve 22 is closed, and the valve 26 is kept closed. As a result, since the differential pressure between the accumulator 12 and the fuel tank 202 increases, the filling speed can be kept high.

Then, by the differential pressure between the 2nd bank (for example, the accumulator 12) and the fuel tank 202, the hydrogen gas accumulated in the accumulator 12 moves to the side of the fuel tank 202, and the pressure of the fuel tank 202 gradually increases as indicated by the dotted line Pt. Accordingly, the pressure (graph indicated by "2nd") of the accumulator 12 gradually decreases. Then, when a time t2 at which the pressure falls below the use lower limit pressure of the 2nd bank elapses, the accumulator to be used is switched from the accumulator 12 to the 3rd bank (for example, the accumulator 14).

At the time of switching to the accumulator 14, the valve controller 65 outputs control signals to the valves 22, 24, and 26 via the communication control circuit 50, and controls opening and closing of each valve. Specifically, the valve 26 is opened, the valve 24 is closed, and the valve 22 is kept closed. As a result, since the differential pressure between the accumulator 14 and the fuel tank 202 increases, the filling speed can be kept high.

Then, by the differential pressure between the 3rd bank (for example, the accumulator 14) and the fuel tank 202, the hydrogen gas accumulated in the accumulator 14 moves to the side of the fuel tank 202, and the pressure of the fuel tank 202 gradually increases as indicated by the dotted line Pt. Accordingly, the pressure (graph indicated by "3rd") of the accumulator 14 gradually decreases. Then, the fuel tank 202 is filled with the hydrogen gas by the 3rd bank until the pressure of the fuel tank reaches the target pressure Pg (for example, 65 to 81 MPa).

As described above, the fuel tank 202 is filled with the hydrogen gas in order from the 1st bank. Further, a filling amount of the hydrogen gas during filling in a case where the fuel tank 202 of the FCV 200 is filled with the hydrogen gas is measured by the dispenser 30.

During such filling, as the filling amount calculation step (S112), the filling amount calculator 87 calculates the calculated filling amount Mc by subtracting the first weight N1 from the weight Nt of the hydrogen gas in the fuel tank 202 at the present time. Since Nt=N1 is obtained at the start of filling, the calculated filling amount Mc is 0. Since Nt=N2 is obtained after the start of filling, the calculated filling amount Mc after the start of filling becomes a value obtained by subtracting the first weight N1 from the second weight N2 (that is, Mc=N2−N1).

Similarly, during the filling, as the filling amount measurement step (S114), the dispenser 30 measures the measured filling amount Mm of the hydrogen gas using the Coriolis-type flowmeter 37. Specifically, the flowmeter 37 measures the mass flow rate at the moment of filling, and generates a pulse for every 1 g, for example, which is a minute flow rate unit. A pulse signal is output to the control circuit 43.

The control circuit 43 calculates the measured filling amount Mm by counting the pulses input from the start of filling and integrating the mass flow rate. The measured filling amount Mm is output to the control circuit 100, received by the dispenser information receiver 67, and stored in the storage device 84 together with the measured time t. The measured filling amount Mm at the start of filling is 0.

Similarly, during the filling, as the filling amount error calculation step (S116), the filling amount error calculator 89 calculates a filling amount error ΔM=Mm−Mc by subtracting the calculated filling amount Mc from the measured filling amount Mm measured at the same timing (time t) at which the calculated filling amount Mc is calculated. At the start of filling, since both the measured filling amount Mm and the calculated filling amount Mc are zero, the filling amount error ΔM is also zero.

Similarly, during the filling, as the determination step (S118), the determiner 90 determines the presence or absence of a failure of the flowmeter 37 using the filling amount error ΔM. Specifically, the determiner 90 determines whether or not the filling amount error ΔM is within a range of a lower limit allowable value α1 or more and an upper limit allowable value α2 or less. When the filling amount error ΔM deviates from the range of the lower limit allowable value α1 or more and the upper limit allowable value α2 or less (NO in S118), the process proceeds to the alarm output step (S120). When the filling amount error ΔM is within the range of the lower limit allowable value α1 or more and the upper limit allowable value α2 or less (YES in S118), the process proceeds to the determination step (S126).

As the alarm output step (S120), when it is determined that the flowmeter 37 fails, the outputter 74 outputs an alarm indicating the failure of the flowmeter 37 to the dispenser 30 during the filling with the hydrogen gas. As an example of the alarm, in the dispenser 30, the alarm lamp 34 indicating the failure of the flowmeter 37 is turned on.

Similarly, during the filling, as the determination step (S126), the determiner 91 determines whether or not the pressure of the fuel tank 202 has reached the target pressure Pg. When the pressure of the fuel tank 202 reaches the target pressure Pg (YES in S126), the process proceeds to the filling stop processing step (S128). When the pressure of the fuel tank 202 does not reach the target pressure Pg (NO in S126), the filling is continued, and the process returns to the FCV information reception step (S102). Until the pressure of the fuel tank 202 reaches the target pressure Pg, each step from the FCV information reception step (S102) to the determination step (S118) is repeated during the filling.

Summarizing the above, the dispenser 30 repeatedly measures the measured filling amount Mm of the hydrogen gas during the filling by using the flowmeter 37. At the same time, the filling amount calculator 87 repeatedly calculates the calculated filling amount Mc of the hydrogen gas from the dispenser 30 to the fuel tank 202 using the information of the pressure Pt, the temperature Tt, and the capacity V of the fuel tank 202 during the filling. The filling amount error calculator 89 repeatedly calculates the filling amount error ΔM by subtracting the calculated filling amount Mc from the measured filling amount Mm at the same timing when the calculated filling amount Mc is calculated.

Then, the determiner 90 compares the calculated filling amount Mc with the measured filling amount Mm during the filling, and repeatedly determines the presence or absence of a failure of the flowmeter 37. That is, the determiner 90 determines whether or not the filling amount error ΔM obtained by subtracting the calculated filling amount Mc from the measured filling amount Mm is within a range of the lower limit allowable value α1 or more and the upper limit allowable value α2 or less. Then, when the failure of the flowmeter 37 occurs, the dispenser 30 outputs an alarm by turning on the alarm lamp 34 or the like. In a short period during the filling, a large variation in the filling amount error ΔM may hardly occur. However, the control circuit 100 can detect a sudden large change (shift) in the filling amount error ΔM.

As the filling stop processing step (S128), when the pressure of the fuel tank 202 reaches the target pressure Pg, the filling with the hydrogen gas is stopped, and the filling processing ends. Specifically, when the pressure measured by the pressure gauge 28 in the vicinity of the outlet of the dispenser 30 reaches the target pressure Pg, the dispenser controller 64 assumes that the pressure of the fuel tank 202 reaches the target pressure Pg, and closes the shut-off valves 36 and 38 in the dispenser 30. In addition, the valve controller 65 outputs control signals to the valves 22, 24, and 26 via the communication control circuit 50, and controls each valve so as to be closed.

Next, as the recording/calculation step (S130), the recorder/calculator 92 calculates a final measured filling amount Mmf at the end of filling measured using the flowmeter 37 and a final calculated filling amount Mcf at the end of filling, and stores the final measured filling amount and the final calculated filling amount in the storage device 88 in association with data of the filling date and time as result data. The final measured filling amount Mmf is the measured filling amount Mm at the end of filling, and is the mass flow rate integrated from the start to the end of filling. The final calculated filling amount Mcf is the calculated filling amount Mc at the end of filling, and is calculated by subtracting the first weight N1 from the second weight N2 at the end of filling. In addition, the recorder/calculator 92 calculates the final filling amount error ΔMf (=Mmf−Mcf) at the end of filling, and stores the final filling amount error in the storage device 88 in association with the data of the filling date and time as the result data, similarly to the above.

From this, a plurality of pieces of result data is accumulated in the storage device 88 by repeatedly filling an unspecified number of FCVs 200 with the hydrogen gas. As a result, the storage device 88 stores a plurality of pieces of past result data in which the final measured filling amount Mmf, the final calculated filling amount Mcf, and the final filling amount error ΔMf are associated. Here, a case where the final filling amount error ΔMf is stored as a plurality of error values is illustrated.

As the average error calculation step (S132), the average error calculator 93 reads the final filling amount error ΔMf for each past hydrogen filling accumulated in the storage device 88, and calculates an average filling amount error ΔMave=ΣΔMf/the number of fillings.

As the difference calculation step (S134), the error difference value calculator 94 calculates an error difference value Mx which is a difference between a statistical value of a plurality of error values based on a plurality of pieces of past result data and an error value in current hydrogen gas filling. Specifically, the error difference value calculator 94 calculates the error difference value Mx by subtracting the current final filling amount error ΔMf from the average filling amount error ΔMave.

As the determination step (S136), the determiner 95 compares the statistical value of the plurality of error values based on the plurality of past result data stored in the storage device 88 with the error value at the end of the current hydrogen gas filling, determines the presence or absence of a failure of the flowmeter 37, and outputs a result.

In the present embodiment, the presence or absence of the failure of the flowmeter 37 is determined based on whether or not the error difference value Mx is within an allowable range. Specifically, the determiner 95 determines whether or not the error difference value Mx is within a range of a lower limit allowable value β1 or more and an upper limit allowable value β2 or less. When the error difference value Mx deviates from the range of the lower limit allowable value β1 or more and the upper limit allowable value β2 or less (NO in S136), the process proceeds to the alarm output step (S138). When the error difference value Mx is within the range of the lower limit allowable value β1 or more and the upper limit allowable value β2 or less (YES in S136), the present flow ends.

As the alarm output step (S138), when it is determined that the flowmeter 37 fails, the outputter 74 outputs an alarm indicating the failure of the flowmeter 37 to the dispenser 30 during the filling with hydrogen gas. As an example of the alarm, in the dispenser 30, the alarm lamp 34 indicating the failure of the flowmeter 37 is turned on.

In the example described above, the average filling amount error ΔMave is used as the statistical value of the plurality of error values based on the plurality of pieces of past result data, but the present invention is not limited thereto. Instead of the average value, for example, a median value may be used.

The respective values of the lower limit allowable values α1 and β1 and the upper limit allowable values α2 and β2 may be appropriately set. Since the deviation occurs due to the expansion of the fuel tank 202 described above in the calculated filling amount by the PVT method, the difference between the measured filling amount and the calculated filling amount by the PVT method is not generally 0, and there is a predetermined offset amount. In consideration of this point, the respective values of the lower limit allowable values α1 and β1 and the upper limit allowable values α2 and β2 may be set.

As illustrated in FIG. 5, instead of the determination step (S118) and the alarm output step (S120) described above, a determination step (S119), an alarm output step (S121), a determination step (S122), and an alarm output step (S123) may be performed as a modification. Similarly, as illustrated in FIG. 6, instead of the determination step (S136) and the alarm output step (S138) described above, a determination step (S140), an alarm output step (S141), a determination step (S142), and an alarm output step (S143) may be performed as a modification.

As the determination step (S119), the determiner 90 determines whether or not the filling amount error ΔM at the present time is the lower limit allowable value α1 or more. When the filling amount error ΔM is the lower limit allowable value α1 or more (YES in S119), the process proceeds to the determination step (S122). When the filling amount error ΔM is not the lower limit allowable value α1 or more (NO in S119), the process proceeds to the alarm output step (S121).

As the alarm output step (S121), when the filling amount error ΔM is not the lower limit allowable value α1 or more, the outputter 74 outputs an alarm 1 indicating the failure of the flowmeter 37 to the dispenser 30 during the filling with the hydrogen gas. As an example of the alarm, in the dispenser 30, the alarm lamp 34 indicating the failure of the flowmeter 37 is turned on.

As the determination step (S122), the determiner 90 determines whether or not the filling amount error ΔM is the upper limit allowable value α2 or less. When the filling amount error ΔM is the upper limit allowable value α2 or less (YES in S122), the process proceeds to the determination step (S126). When the filling amount error ΔM is not the upper limit allowable value α2 or less (NO in S122), the process proceeds to the alarm output step (S123).

As the alarm output step (S123), when the filling amount error ΔM is not the upper limit allowable value α2 or less, the outputter 74 outputs an alarm 2 indicating the failure of the flowmeter 37 to the dispenser 30 during the filling with the hydrogen gas. As an example of the alarm, in the dispenser 30, the alarm lamp 35 indicating the failure of the flowmeter 37 is turned on.

As described above, in the determination processing during the filling, when the filling amount error ΔM is not the upper limit allowable value α2 or less, either or both of the failure of the flowmeter 37 and the leakage of the pipe from the flowmeter 37 to the fuel tank 202 are considered as the cause. On the other hand, when the filling amount error ΔM is not the lower limit allowable value α1 or more, the failure of the flowmeter 37 can be specified. Therefore, the determination processing is divided into the upper limit and the lower limit, and the contents of the alarm are separated, so that a failure location can be easily specified.

Similarly, as illustrated in FIG. 6, as the determination step (S140), the determiner 95 determines whether or not the calculated error difference value Mx is the lower limit allowable value β1 or more. When the error difference value Mx is the lower limit allowable value β1 or more (YES in S140), the process proceeds to the determination step (S142). When the error difference value Mx is not the lower limit allowable value β1 or more (NO in S140), the process proceeds to the alarm output step (S141).

As the alarm output step (S141), when the error difference value Mx is not the lower limit allowable value β1 or more, the outputter 74 outputs an alarm 1 indicating the failure of the flowmeter 37 to the dispenser 30 during the filling with the hydrogen gas. As an example of the alarm, in the dispenser 30, the alarm lamp 34 indicating the failure of the flowmeter 37 is turned on.

As the determination step (S142), the determiner 95 determines whether or not the calculated error difference value Mx is the upper limit allowable value β2 or less. When the error difference value Mx is the upper limit allowable value β2 or less (YES in S142), the processing ends. When the error difference value Mx is not the upper limit allowable value β2 or less (NO in S142), the process proceeds to the alarm output step (S143).

As the alarm output step (S143), when the error difference value Mx is not the upper limit allowable value β2 or less, the outputter 74 outputs an alarm 2 indicating the failure of the flowmeter 37 to the dispenser 30 during the filling with the hydrogen gas. As an example of the alarm, in the dispenser 30, the alarm lamp 35 indicating the failure of the flowmeter 37 is turned on.

As described above, in the determination processing at the end of filling, when the error difference value Mx is not the upper limit allowable value β2 or less, either or both of the failure of the flowmeter 37 and the leakage of the pipe from the flowmeter 37 to the fuel tank 202 are considered as the cause. On the other hand, when the error difference value Mx is not the lower limit allowable value β1 or more, the failure of the flowmeter 37 can be specified. Therefore, the determination processing is divided into the upper limit and the lower limit, and the contents of the alarm are separated, so that a failure location can be easily specified.

Note that the filling amount of the hydrogen gas in each of the accumulators 10, 12, and 14 is reduced by the filling operation described above. Therefore, next, the pressure recovery mechanism 104 recovers the pressure in each of the accumulators 10, 12, and 14. The pressure recovery mechanism 104 includes the compressor 40, the valves 21, 23, and 25, and the like. First, the system controller 58 selects a supply source of the hydrogen gas to be connected to the suction side of the compressor 40 from a cylinder, an intermediate accumulator, a hydrogen trailer, or a hydrogen production apparatus (none of which are illustrated in the drawings). Then, under the control of the system controller 58, the pressure recovery controller 61 controls the pressure recovery mechanism 104, and recovers the pressure in each of the accumulators 10, 12, and 14.

Specifically, the following operation is performed. In the accumulator of each bank used for filling of the fuel tank 202, the pressure may also be recovered during the filling. However, since there is not enough time to recover pressure to a prescribed pressure, the pressure should be recovered after the filling. Since the 1st bank, the 2nd bank, and the 3rd bank are switched in this order, first, the pressure of the accumulator 10 to be the 1st bank is recovered. The valve controller 60 opens the valve 21 from a state where the valves 21, 23, and 25 are closed.

Then, the compressor controller 62 drives the compressor 40, sends the hydrogen gas of the low pressure (for example, 0.6 MPa) from the supply source of the hydrogen gas while compressing the hydrogen gas, and fills the accumulator 10 with the hydrogen gas until the pressure of the accumulator 10 reaches a predetermined pressure P0 (for example, 82 MPa), thereby recovering the pressure of the accumulator 10.

In this way, even when a next FCV 200 arrives at the hydrogen station 102, the hydrogen gas can be supplied similarly.

As described above, according to the present embodiment, the accuracy of the flowmeter 37 can be continuously verified. Therefore, it is possible to avoid performing the filling operation while using the failed flowmeter 37.

Next, another example of calculating the calculated filling amount Mc in the filling amount error calculation step (S116) described above will be described. In the filling amount error calculation step (S116) described above, the capacity V of the fuel tank 202 used when the calculated filling amount Mc is calculated is a predetermined value unique to the FCV 200, and the expansion rate of the fuel tank 202 is not particularly considered. Therefore, since the deviation occurs in the calculated filling amount by the PVT method due to the expansion of the fuel tank 202 described above, the difference between the measured filling amount and the calculated filling amount by the PVT method is not generally 0, and there is a predetermined offset amount.

As a result of intensive studies by the inventors of the present application, it has been found that the deviation due to expansion of the fuel tank 202 is not always the same, and the offset amount changes depending on the difference between the first pressure P1 at the start of filling and the second pressure P2 at the end of filling. Table 1 shows filling data acquired when hydrogen is filled in the hydrogen station 102 a plurality of times.

TABLE 1

| | Hydrogen station filling data | | | | | Calculated value | | |
|---|---|---|---|---|---|---|---|---|
| | Measured filling amount (Mm) [kg] | First pressure (P1) [MPa] | Second pressure (P2) [MPa] | First temperature (T1) [° C.] | Second temperature (T2) [° C.] | Calculated filing amount (Mc) [kg] | Filling amount error (ΔM) [kg] | Percentage error [%] |
| Filling data 1 | 3.48 | 15.5 | 79.9 | 18.4 | 65.3 | 3.359 | 0.121 | 3.47 |
| Filling data 2 | 2.5 | 27.6 | 77.7 | 15.7 | 54.1 | 2.411 | 0.089 | 3.56 |
| Filling data 3 | 3.99 | 9.9 | 80.8 | 12 | 65.3 | 3.864 | 0.126 | 3.17 |
| Filling data 4 | 2.54 | 27 | 77.7 | 15.4 | 55.3 | 2.441 | 0.099 | 3.91 |
| Filling data 5 | 4.03 | 9.4 | 80.8 | 13.2 | 66.4 | 3.903 | 0.127 | 3.16 |
| Filling data 6 | 2.07 | 32.9 | 75.9 | 14.9 | 50.2 | 1.99 | 0.08 | 3.87 |
| Filling data 7 | 3.34 | 17.2 | 79.9 | 13.1 | 61.2 | 3.231 | 0.109 | 3.26 |
| Filling data 8 | 3.32 | 17.6 | 79.8 | 15.4 | 62.5 | 3.193 | 0.127 | 3.84 |
| Filling data 9 | 3 | 20.8 | 77.6 | 5.7 | 53.2 | 2.875 | 0.125 | 4.15 |
| Filling data 10 | 3.05 | 19.9 | 77.2 | 0.1 | 51.8 | 2.912 | 0.138 | 4.52 |
| . . . | — | — | — | — | — | — | — | — |
| Filling data N | — | — | — | — | — | — | — | — |
| Average value | | | 78.73 | | | 3.018 | 0.114 | 3.691 |

Next, the valve controller 60 closes the valve 21 and opens the valve 23 instead. Then, the compressor controller 62 drives the compressor 40, sends the hydrogen gas of the low pressure (for example, 0.6 MPa) while compressing the hydrogen gas, and fills the accumulator 12 with the hydrogen gas until the pressure of the accumulator 12 reaches the predetermined pressure P0 (for example, 82 MPa), thereby recovering the pressure of the accumulator 12.

Next, the valve controller 60 closes the valve 23 and opens the valve 25 instead. Then, the compressor controller 62 drives the compressor 40, sends the hydrogen gas of the low pressure (for example, 0.6 MPa) while compressing the hydrogen gas, and fills the accumulator 14 with the hydrogen gas until the pressure of the accumulator 14 reaches the predetermined pressure P0 (for example, 82 MPa), thereby recovering the pressure of the accumulator 14.

As the filling data, the measured filling amount Mm, the first pressure P1, the second pressure P2, the first temperature T1, and the second temperature T2 are shown. The second pressure P2 and the second temperature T2 are data at the end of filling. In addition, the control circuit 100 calculates the calculated filling amount Mc, subtracts the calculated filling amount Mc from the measured filling amount Mm, and calculates the filling amount error ΔM. The percentage error shown in Table 1 is a value of 100×(filling amount error ΔM/measured filling amount Mm).

Figure 8:
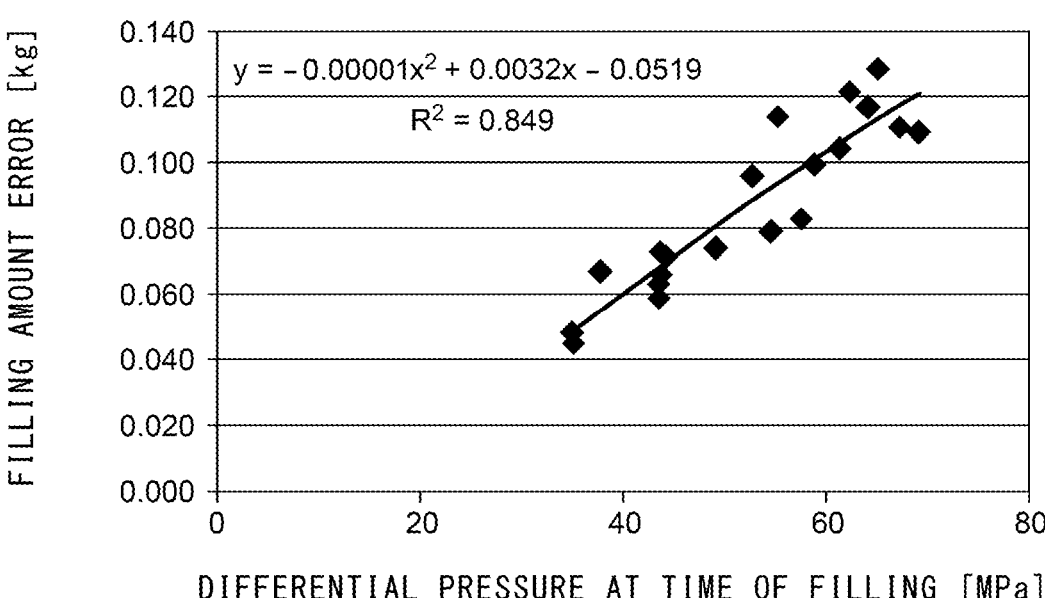
FIG. 8 is a graph illustrating a relation between a differential pressure at the time of filling and a filling amount error in each filling data in Table 1.

FIG. 8 is a graph illustrating a relation between a differential pressure at the time of filling and a filling amount error in each filling data in Table 1. A horizontal axis of the graph illustrated in FIG. 8 represents the differential pressure [MPa] at the time of filling, which is obtained by subtracting the first pressure P1 from a standard pressure Ps of the fuel tank 202 at the end of filling. As the standard pressure Ps, an average value of the second pressure P2 at the end of filling included in a plurality of pieces of filling data acquired in the past can be used. Further, the filling amount error with respect to the differential pressure at the time of filling calculated assuming that the average value of the second pressure P2 at the end of filling is the standard pressure Ps is plotted as illustrated in FIG. 8, and then the standard pressure Ps corrected such that a determination coefficient $R^2$ of an approximate expression y approaches 1 may be used. A known fitting method or the like can be used to correct the standard pressure Ps. Since the standard pressure Ps can also vary depending on the outside air temperature, the standard pressure Ps may be statistically calculated for each season with a different outside air temperature. A specific value of the standard pressure Ps is 78 [MPa] in the fuel tank in one example. A vertical axis of the graph illustrated in FIG. 8 represents the filling amount error ΔM [kg].

As illustrated in FIG. 8, the filling amount error ΔM increases as the differential pressure at the time of filling increases, and the relation represented by the expression y is obtained. Therefore, it has been found that there is a high correlation between the differential pressure at the time of filling and the filling amount error. The expression y and the standard pressure Ps are values suitable for a case of a certain type of fuel tank. However, if the expression y is statistically calculated for each type of fuel tank or each vehicle type, various FCVs 200 arriving at the hydrogen station 102 can be handled.

Therefore, based on the result illustrated in FIG. 8, the calculated filling amount Mc is calculated using a value in which the expansion rate of the tank is considered as the capacity of the tank used in the PVT method. Specifically, the first function indicating the first capacity V1 of the fuel tank 202 in the filling amount calculation before the start of filling is $V1=Vs+(Vs \times Ex) \times (P1/Ps)^3$, when the standard capacity unique to the tank is set to Vs and the expansion rate is set to Ex. In the first function, a correction amount of the tank capacity according to the expansion rate Ex is proportional to the cube of the first pressure P1. In addition, the second function indicating the second capacity V2 of the fuel tank 202 in the filling amount calculation after the start of filling is $V2=Vs+(Vs \times Ex) \times (P2/Ps)^3$. In the second function, a correction amount of the tank capacity according to the expansion rate Ex is proportional to the cube of the second pressure P2. Note that the expansion rate Ex and the standard capacity Vs are set according to the type of the fuel tank 202 with reference to the result illustrated in FIG. 8 described above, for example, and are stored in the storage device 80 in advance. Instead of setting the first function and the second function as the mathematical expressions, the first function and the second function may be stored in the storage device 80 in advance as a table according to parameters such as the first pressure P1 and the second pressure P2 of the fuel tank. The second function may be $V2=Vs+(Vs \times Ex) \times (P2/Ps)^1$. In other words, in the second function, the correction amount of the tank capacity according to the expansion rate Ex may be proportional to the second pressure P2.

Next, a flowmeter failure determination method using the first capacity V1 and the second capacity V2 in which the expansion rate of the fuel tank 202 is considered will be described. An outline of a hydrogen gas filling method including the determination method is substantially the same as that in the flowcharts illustrated in FIGS. 5 and 6 described above. A difference is to use the first capacity V1 and the second capacity V2 in which the expansion rate of the fuel tank 202 is considered in the process of calculating the calculated filling amount Mc used in the filling amount error calculation step (S116).

Specifically, the flowmeter failure determination method according to the present embodiment includes: a step (S114) of measuring a filling amount (measured filling amount Mm) of hydrogen gas filled in a fuel tank 202 using a flowmeter 37; a step (S102) of acquiring information of a pressure P and a temperature T of the fuel tank 202; a step (S112) of calculating a filling amount (calculated filling amount Mc) of the hydrogen gas filled in the fuel tank 202 based on the acquired pressure P and temperature T and the capacity V of the fuel tank 202 in which an expansion rate Ex of the fuel tank 202 is considered; and a step (S118) of determining presence or absence of a failure of the flowmeter 37 using an error value (filling amount error ΔM) between the measured filling amount (measured filling amount Mm) and the calculated filling amount (calculated filling amount Mc).

As a result, in the step (S112) of calculating the filling amount, when the calculated filling amount Mc is calculated from the information of the pressure P, the temperature T, and the capacity V of the fuel tank 202, the expansion rate Ex of the tank is considered, so that the accuracy of the calculated filling amount Mc is improved. In other words, since the filling amount error ΔM between the measured filling amount Mm and the calculated filling amount Mc is small and the variation is small, the accuracy of failure determination of the flowmeter 37 is improved. The filling amount error ΔM may be calculated at any timing after the start of filling. The filling amount error ΔM may be calculated at the end of filling, and the validity of the filling amount error ΔM may be evaluated at the end of filling. By evaluating the validity of the filling amount error ΔM at the end of filling, it is possible to determine whether or not the filling amount of the hydrogen gas is correctly measured for each filling. The filling amount error ΔM may be calculated in the middle of filling before the end of filling, and the validity of the filling amount error ΔM in the middle of filling may be evaluated. By evaluating the validity of the filling amount error ΔM in the middle of the filling, it is possible to detect a defect occurring in the middle of the filling at an early stage.

The flowmeter failure determination method according to the present embodiment includes an alarm output step (S120, S121, and S123) of outputting a determination result. In the example described above, the alarm lamp is turned on, but the type of the alarm is not limited thereto. In the alarm output step, a signal for operating a reporter (display panel, sound output, alarm lamp, and the like) of the dispenser 30 including the flowmeter 37 may be output. In the alarm output step, a signal for reporting an alarm to an observer or a monitoring device performing monitoring at a remote place may be output via a network.

The calculated filling amount Mc is calculated by $Mc=N2-N1$ using the first weight $N1=\rho(P1, T1) \times V1$ calculated from the first pressure P1, the first temperature T1, and the first capacity V1 of the fuel tank 202 before the start of filling and the second weight $N2=\rho(P2, T2) \times V2$ calculated from the second pressure P2, the second temperature T2, and the second capacity V2 of the fuel tank 202 after the start of filling (S112). As described above, the first capacity V1 and the second capacity V2 of the fuel tank 202 can be calculated using the first function and the second function expressed by the mathematical expressions stored in the storage device 80. As a result, it is possible to perform failure determination by simple calculation based on information from the pressure gauge 206 or the thermometer 207 of the fuel tank 202.

Here, the first function and the second function are different. In a situation where the pressure in the fuel tank 202 before the start of filling is relatively low, the capacity in which the expansion rate of the fuel tank 202 is considered can be accurately calculated using the first function. On the other hand, in a situation where the pressure in the fuel tank 202 after the start of filling is relatively high, the capacity in which the expansion rate of the fuel tank 202 is considered can be accurately calculated using the second function. That is, in the first function, the tank capacity according to the expansion rate is corrected based on the first pressure P1, and in the second function, the tank capacity according to the expansion rate is corrected based on the second pressure P2. Therefore, the capacity of the fuel tank 202 can be calculated with higher accuracy than when it is assumed that the correction amount according to the expansion rate is constant regardless of the pressure in the tank. In addition, since the filling amount error $\Delta M$ can be more appropriately calculated for each filling by incorporating a correction function in which the expansion rate is considered into a calculation formula of the calculated filling amount Mc, the failure determination of the flowmeter 37 can be easily performed in a short time. In other words, even if a plurality of pieces of past result data necessary for the calculation of the average filling amount error $\Delta M$ave is not accumulated, the failure determination of the flowmeter 37 can be accurately performed.

The first capacity V1 before the start of filling is calculated by a first function $(V1=V+(V\times Ex)\times(P1/Ps)^3)$ that is non-linear with respect to the first pressure P1. As a reason why such a function is preferable, the inventors of the present application have focused on the fact that a deviation (that is, the filling amount error $\Delta M$) between the measured filling amount Mm and the calculated filling amount Mc is large in a situation where the filling amount of the fuel tank 202 is large (a situation where the difference between the first pressure P1 and the second pressure P2 is large). Since the first pressure P1 of the fuel tank 202 depends on a consumption amount of the hydrogen gas according to a travel distance of the FCV 200 arriving at the hydrogen station 102, the first pressure P1 has a large variation according to the situation. On the other hand, the second pressure P2 of the fuel tank 202 has a small variation according to the situation. Therefore, the situation in which the filling amount of the fuel tank 202 is large can be said to be a situation in which the first pressure P1 of the fuel tank 202 is small. By using a non-linear function with respect to the acquired information of the pressure (first pressure P1) in the tank as the first function in which the first pressure P1 is considered, the capacity of the fuel tank 202 can be calculated with higher accuracy than a case where it is assumed that the expansion rate increases in proportion to the pressure in the tank. This is particularly effective when the first pressure P1 is small, and the filling amount is large.

On the other hand, the second function in which the second pressure P2 is considered may use a non-linear function or a linear function with respect to the acquired pressure (second pressure P2) in the tank. Since the second pressure P2 at the end of filling has a smaller variation according to the situation than the first pressure P1, the filling amount error $\Delta M2$ can be accurately calculated even when a value of (P2/Ps) is cubed and corrected or even when the value is raised to the first power and corrected. However, as a result of the evaluation using actual data, in the second function in which the second pressure P2 at the end of filling is considered, a result in which the value is preferably raised to the first power and corrected is obtained. Since the second pressure P2 in the middle of filling has a larger variation according to the situation than when the filling ends, it may be desirable to use a non-linear function in which the value of (P2/Ps) is cubed and corrected when the second weight N2 in the middle of filling is calculated.

The control circuit 100 (specifically, the receiver 52) may acquire information regarding the type of the fuel tank 202 from the FCV 200. The control circuit 100 may acquire information regarding the vehicle type from the FCV 200 and specify the type of the fuel tank 202 corresponding to the vehicle type. The storage device 80 may store in advance a table that associates the vehicle type with the type of the fuel tank. The first function and the second function related to the first capacity V1 or the second capacity V2 may be set according to the type of the fuel tank 202. As a result, it is possible to determine the failure of the flowmeter 37 when fuel tanks of various vehicle types are filled with hydrogen gas.

As described above, according to the failure determination method according to the present embodiment, the accuracy of the dispenser 30, more specifically, the flowmeter 37 in the hydrogen station 102 can be verified. In addition, it is possible to continuously verify the accuracy of the flowmeter 37 every time the FCV 200 is filled with hydrogen gas without closing the hydrogen station 102.

A hydrogen filling apparatus 500 according to the present embodiment includes: a measurer (dispenser 30) that measures a filling amount (measured filling amount Mm) of hydrogen gas filled in a fuel tank 202 of an automobile using a flowmeter 37; an acquirer (receiver 52) that acquires information of a pressure P and a temperature T of the fuel tank 202; a filling amount calculator 87 that calculates a filling amount (calculated filling amount Mc) of the hydrogen gas filled in the fuel tank 202 from the measurer (dispenser 30) based on the acquired pressure P and temperature T and the capacity V of the fuel tank 202 in which an expansion rate Ex of the fuel tank 202 is considered; and a determiner 90 that determines the presence or absence of a failure of the flowmeter 37 using an error value (filling amount error $\Delta M$) between the filling amount (measured filling amount Mm) measured using the flowmeter 37 and the calculated filling amount (calculated filling amount Mc).

Although the present invention has been described above with reference to the above-described embodiments, the present invention is not limited to the above-described embodiments, and structures obtained by appropriately combining or replacing the structures illustrated in the embodiments are also included in the present invention. In addition, it is also possible to appropriately rearrange the combinations or the order of processing in the embodiments based on the knowledge of those skilled in the art and to add modifications such as various design changes to the embodiments, and the embodiments to which such modifications are added can also be included in the scope of the present invention.

The invention claimed is:

1. A flowmeter failure determination method comprising:
   a step of measuring a filling amount of hydrogen gas filled in a fuel tank of an automobile, using a flowmeter;
   a step of acquiring information of a pressure and a temperature of the fuel tank;
   a step of calculating the filling amount of the hydrogen gas filled in the fuel tank based on the acquired pressure and temperature and a capacity of the fuel tank in which an expansion rate of the fuel tank is considered, by 1) calculating a first weight of the hydrogen gas in the fuel tank before a start of filling based on a first pressure, a first temperature, and a first capacity of the fuel tank before the start of filling, wherein the first capacity is calculated using the expansion rate and the first pressure, 2) calculating a second weight of the hydrogen gas in the fuel tank after the start of filling based on a second pressure, a second temperature, and a second capacity of the fuel tank after the start of filling, wherein the second capacity is calculated using the expansion rate and the second pressure, and 3) calculating the filling amount using the first weight and the second weight; and a step of determining presence or absence of a failure of the flowmeter using an error value between the measured filling amount and the calculated filling amount.

2. The flowmeter failure determination method according to claim 1, wherein the first capacity is calculated using a first function that is non-linear with respect to the first pressure, and the second capacity is calculated using a second function that is linear or non-linear with respect to the second pressure.

3. The flowmeter failure determination method according to claim 2, further comprising a step of specifying a type of the fuel tank, wherein the first function and the second function are set according to the type of the fuel tank.

4. A hydrogen filling apparatus comprising:

a measurer structured to measure a filling amount of hydrogen gas filled in a fuel tank of an automobile, using a flowmeter;

an acquirer structured to acquire information of a pressure and a temperature of the fuel tank;

a filling amount calculator structured to calculate the filling amount of the hydrogen gas filled in the fuel tank from the measurer based on the acquired pressure and temperature and a capacity of the fuel tank in which an expansion rate of the fuel tank is considered, by 1) calculating a first weight of the hydrogen gas in the fuel tank before a start of filling based on a first pressure, a first temperature, and a first capacity of the fuel tank before the start of filling, wherein the first capacity is calculated using the expansion rate and the first pressure, 2) calculating a second weight of the hydrogen gas in the fuel tank after the start of filling based on a second pressure, a second temperature, and a second capacity of the fuel tank after the start of filling, wherein the second capacity is calculated using the expansion rate and the second pressure, and 3) calculating the filling amount using the first weight and the second weight; and a determiner structured to determine presence or absence of a failure of the flowmeter using an error value between the filling amount measured using the flowmeter and the calculated filling amount.

* * * * *